(12) United States Patent
Morita

(10) Patent No.: US 8,508,707 B2
(45) Date of Patent: Aug. 13, 2013

(54) LIQUID CRYSTAL DISPLAY DEVICE

(75) Inventor: Shin Morita, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 0 days.

(21) Appl. No.: 13/324,378

(22) Filed: Dec. 13, 2011

(65) Prior Publication Data

US 2012/0154732 A1      Jun. 21, 2012

(30) Foreign Application Priority Data

Dec. 20, 2010   (JP) ................................ 2010-283083

(51) Int. Cl.
*G02F 1/1339*      (2006.01)

(52) U.S. Cl.
USPC ........................... 349/153; 349/122; 349/151

(58) Field of Classification Search
None
See application file for complete search history.

(56) References Cited

U.S. PATENT DOCUMENTS 7,202,931 B2 *   4/2007   Chung et al. ................... 349/153
7,443,468 B2 *  10/2008   Okita et al. ................... 349/107
7,986,393 B2     7/2011   Morita 2010/0020277 A1   1/2010  Morita
2010/0141874 A1   6/2010  Morita
2010/0309401 A1  12/2010  Morita

FOREIGN PATENT DOCUMENTS

| JP | 4-147218 A | 5/1992 |
|----|------------|--------|
| JP | 10-123540 A | 5/1998 |
| JP | 2009-222911 | 10/2009 |

OTHER PUBLICATIONS

Office Action issued Jan. 22, 2013, in Japanese Patent Application No. 2010-283083 (submitting English translation only).

* cited by examiner

*Primary Examiner* — Richard Kim
(74) *Attorney, Agent, or Firm* — Oblon, Spivak, McClelland, Maier & Neustadt, L.L.P.

(57) ABSTRACT

In one embodiment, a liquid crystal display device includes a liquid crystal display panel having an active area for displaying images. The active area has pixels arranged in a matrix shape. The liquid crystal display device includes a first substrate having pixel electrodes of the pixels, a second substrate having a plurality of colored layers arranged side by side, and a counter electrode arranged on the colored layers facing the respective pixel electrodes. A seal element is arranged on a seal portion surrounding the active area and attaching the first substrate and the second substrate. A liquid crystal layer is held between the first substrate and the second substrate. The second substrate includes a convex portion arranged between the seal element and the active area, and the convex portion is formed of the same material as one of the plurality of colored layers.

15 Claims, 5 Drawing Sheets

LIQUID CRYSTAL DISPLAY DEVICE

CROSS-REFERENCE TO RELATED APPLICATIONS

This application is based upon and claims the benefit of priority from prior Japanese Patent Application No. 2010-283083, filed Dec. 20, 2010, the entire contents of which are incorporated herein by reference.

FIELD

Embodiments described herein relate generally to a liquid crystal display device.

BACKGROUND

Liquid crystal display devices are widely used as display devices for various kinds of equipments such as personal computers, OA equipments, and TV sets because the display devices have many advantages such as lightness, compactness and low power consumption. In recent years, the liquid crystal display device is also used in mobile terminal equipments such as a mobile phone, a car navigation device and a game player.

The liquid crystal display device includes a liquid crystal display panel having a liquid crystal layer sandwiched between an array substrate and a counter substrate with a seal element. The liquid crystal display panel includes a rectangular shaped active area for displaying an image, which is surrounded by the seal element.

In the liquid crystal display panel, the seal element flows out to the active area when the array substrate and the counter substrate are attached with the seal element. In particular, the seal element tends to flow along a small gap area between the opposed substrates by a capillary action. A wiring drawn out of the active area crosses the seal element so that the seal element tends to spread by flowing on the wiring located at the small gap area. The flowing out seal element may result in a display defect.

Though it is thought to make a gap between the active area and the seal element larger, such an approach runs counter to the current requirement for a small outside dimension. In order to solve this problem, a technology in which the drawn out wiring layer is provided with a crank area is proposed to weaken the flowing strength of the seal element. Further, a technology in which a slit region with a belt shape is provided on a color filter layer formed on the counter substrate corresponding to the wiring layer is proposed to suppress the spread of the seal element by making the gap between the substrates large.

While the gap between the array substrate and the counter substrate is several micrometers, the thickness of the array substrate is about 0.5 micrometer even laminating wirings on the substrate. Therefore, more effective countermeasure is needed. Furthermore, when some slits are formed on the pattern of the colored layer, the colored layer at its end is formed in a thin shape, and peels off from the substrate. This results in lowering of a manufacturing yield.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
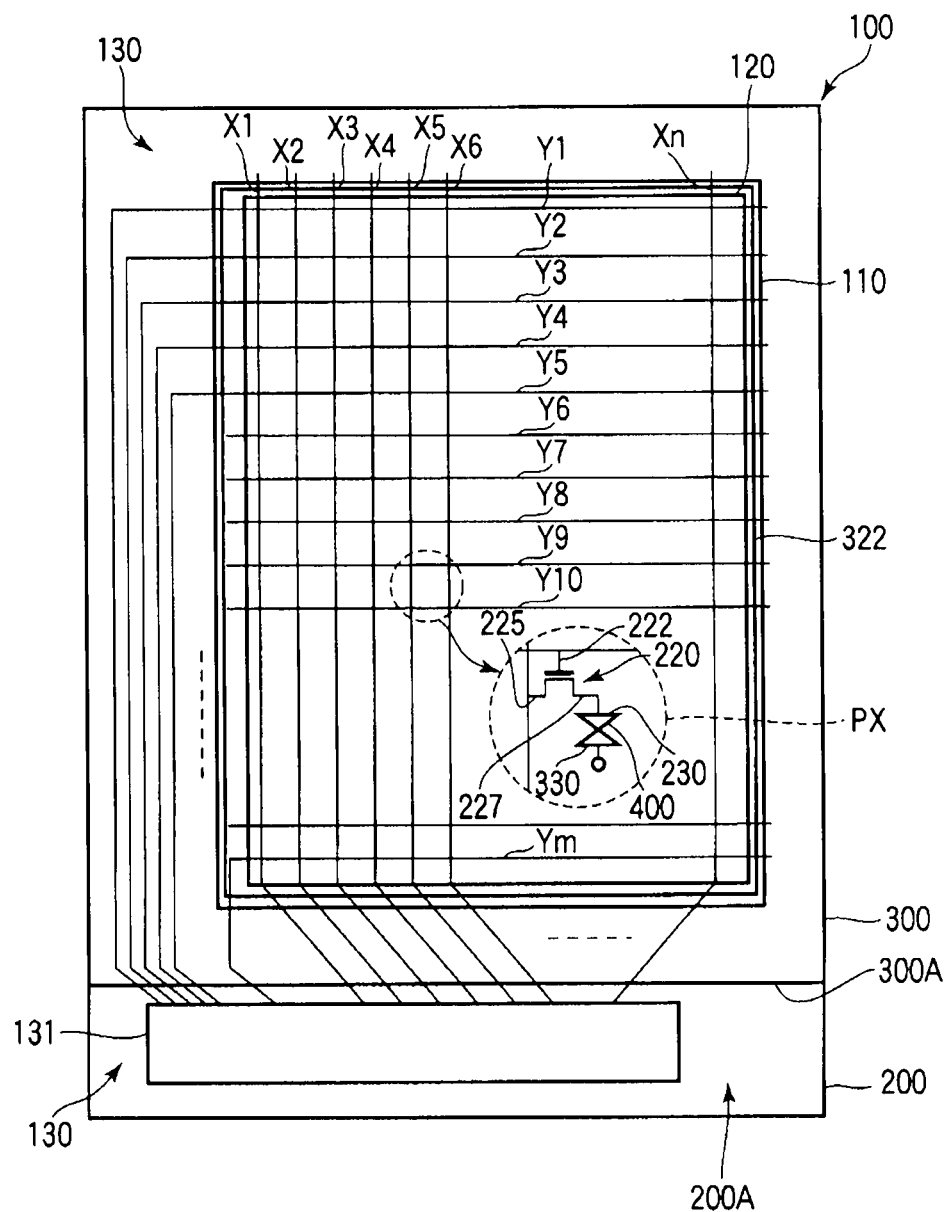
FIG. 1 is a diagram showing schematically a structure of a liquid crystal display device according to a first embodiment.

A liquid crystal display device according to an exemplary embodiment of the present invention will now be described with reference to the accompanying drawings wherein the same or like reference numerals designate the same or corresponding parts throughout the several views.

According to this embodiment, a liquid crystal display device includes: a liquid crystal display panel having an active area for displaying images, the active area having pixels arranged in a matrix shape; a first substrate including pixel electrodes of the pixels; a second substrate having a plurality of colored layers arranged side by side and a counter electrode arranged on the colored layers facing the respective pixel electrodes; a seal element arranged on a seal portion surrounding the active area and attaching the first substrate and the second substrate; a liquid crystal layer held between the first substrate and the second substrate; wherein the second substrate includes a convex portion arranged between the seal element and the active area, and the convex portion is formed of the same material as one of the plurality of colored layers.

As shown in FIG. 1, the liquid crystal display device includes an approximate rectangular flat liquid crystal display panel 100. The liquid crystal display panel 100 has a pair of substrates, which are an array substrate 200 (first substrate) and a counter substrate 300 (second substrate), and a liquid crystal layer 400 held therebetween which functions as a light modulation layer. The array substrate 200 and the counter substrate 300 are attached by a seal element 110.

The liquid crystal display panel 100 includes an approximate rectangular active area 120 to display images surrounded by the seal element 110. The active area 120 consists of a plurality of pixels PX arranged in a matrix.

In the active area 120, the array substrate 200 includes a plurality of gate lines Y (1, 2, 3, ..., m) which extend in a row direction of the pixels PX, a plurality of source lines X (1, 2, 3, ..., n) which extend in a column direction of the pixels PX crossing the gate lines Y so as to interpose a dielectric layer therebetween and switching elements 220 which are disposed near the intersections of the gate lines Y and the source lines X. Pixel electrodes 230 are connected to the associated switching elements 220.

The switching elements 220 are formed by Thin Film Transistors (TFT) which include a semiconductor layer made of amorphous or poly-silicon.

A gate electrode 222 of the switching elements 220 is electrically connected to the corresponding gate line Y or integrally formed with the gate line Y. A source electrode 225 of the switching elements 220 is connected to the corresponding source line X or integrally formed with the source line X.

A drain electrode 227 of the switching elements 220 is connected to the pixel electrode 230 of the pixels PX.

The counter substrate 300 includes a counter electrode 330 which is commonly disposed on the counter substrate 300 for all pixels PX. Furthermore, the liquid crystal display panel 100 includes a connection area 131 that is disposed at an outer periphery portion 130 arranged outside of the active area 120. The connection area 131 may be coupled to driver IC chips which function as signal sources or a flexible wiring board. In the example shown in FIG. 1, the connection area 131 is disposed on an extending portion 200A of the array substrate 200 which extends outside from an edge 300A of the counter substrate 300.

The respective gate lines Y (1, 2, 3, . . . , m) are coupled to the connection area 131 via the outer periphery portion 130. Similarly, the respective source lines X (1, 2, 3, . . . , n) are coupled to the connection area 131 via the outer periphery portion 130.

Figure 2:
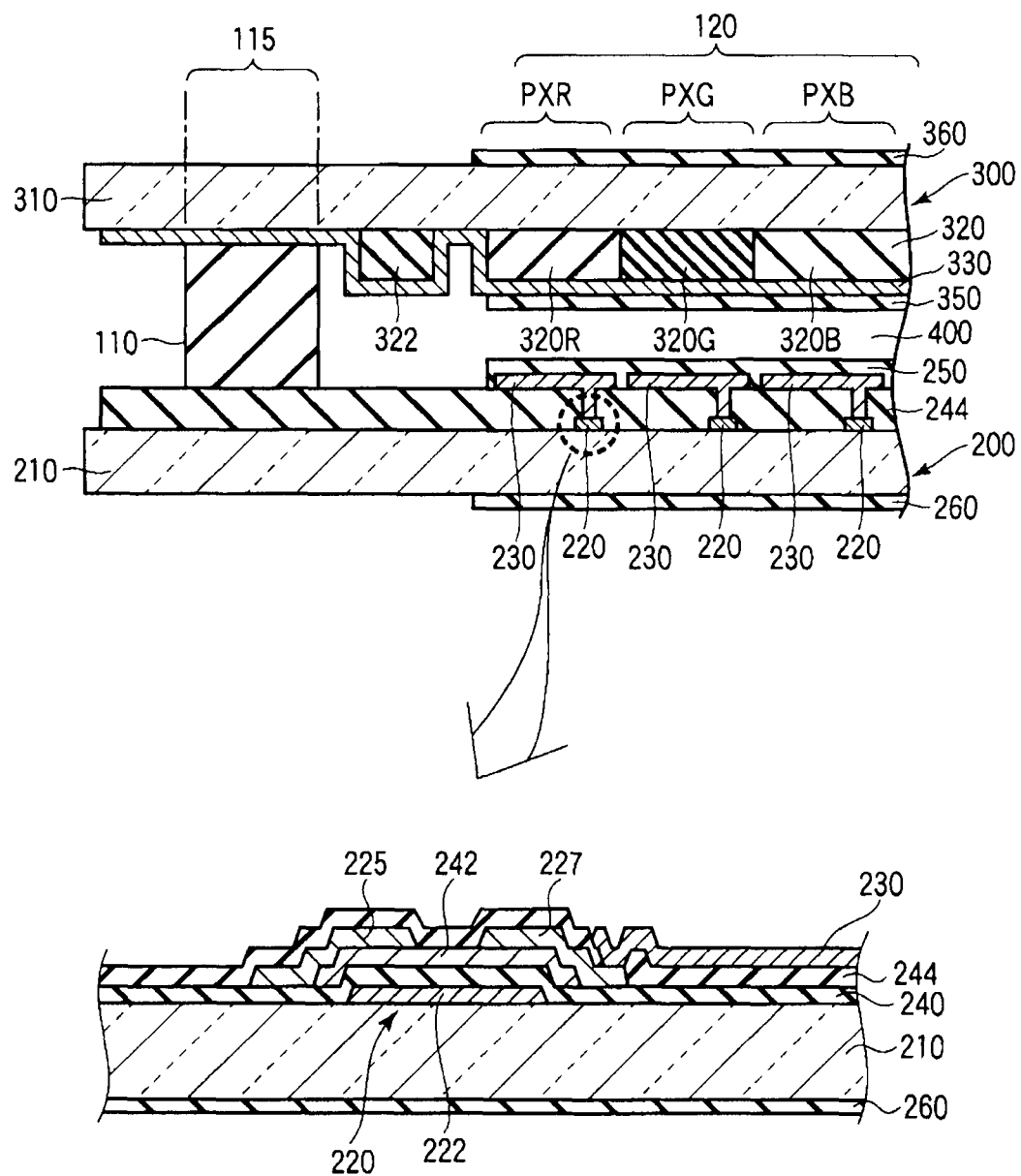
FIG. 2 is a figure showing an example of a cross-section of the liquid crystal display device shown in FIG. 1.

Next, the constructions of the array substrate 200 and the counter substrate 300 are respectively explained in detail. As shown in FIG. 2, the array substrate 200 is formed using an insulating substrate 210 having a light transmissive characteristic, for example, a glass. The gate electrode 222 of the switching element 220 is arranged on the insulating substrate 210 with the gate line Y and the like. The gate electrode 222 is covered with a gate insulating layer 240, for example, made of a silicon nitride film ($Si_3N_4$).

The semiconductor layer 242 of the switching element 220 is formed on the gate insulating layer 240. The source electrode 225 and the drain electrode 227 of the switching element 220 contact with the semiconductor layer 242. The source electrode 225 and drain electrode 227 are covered with a passivation film 244 like a silicon nitride film ($Si_3N_4$).

The pixel electrode 230 is formed on the passivation film 244 for each pixel PX. The pixel electrode 230 is connected to the drain electrode 227 of the switching transistor 220 through a contact hole formed in the passivation film 244.

In the transmissive type liquid crystal display device which displays an image by transmitting light from a backlight unit, the pixel electrodes 230 are made of a light transmissive conductive material, for example, Indium Tin Oxide (ITO), Indium Zinc Oxide (IZO) and the like. On the other hand, the pixel electrodes 230 are made of a light reflective conductive material, for example, aluminum (Al), molybdenum (Mo) and the like, for use in a reflective liquid crystal display panel which displays an image by reflecting light.

The counter substrate 300 is formed of an insulating substrate 310. In the color liquid crystal display device, the liquid crystal display panel 100 includes a plurality of pixels PX that are red color pixels PXR, green color pixels PXG, and blue color pixels PXB.

In the embodiment shown in FIG. 2, the counter substrate 300 includes a color filter layer 320 (R, G, B) in the active area 120, which is formed on one surface (surface opposing the liquid crystal layer) of the insulating substrate 310 facing a respective pixels PX.

Namely, the counter substrate 300 is equipped with a red color filter layer 320R which consists of resin colored so that the light of red dominant wavelength passes corresponding to the red pixel PXR, a green color filter layer 320G which consists of resin colored so that the light of green dominant wavelength passes corresponding to the green pixel element PXG, and a blue color filter layer 320B which consists of resin colored so that the light of blue dominant wavelength passes corresponding to the blue pixel PXB.

On the color filter layer 320 (R, G, B), a pillar-shaped spacer SS (shown in FIG. 3) is arranged. When the array board 200 and the counter substrate 300 are pasted together, above end of the spacer SS contacts the array substrate 200, and the pillar-shaped spacer SS maintains a predetermined gap between the array substrate 200 and the counter substrate 300.

The counter electrode 330 is formed on the color filter layer 320 facing the plurality of pixels PX. The counter electrode 330 is made of a conductive material such as ITO and IZO with a light transmissive characteristics.

As shown in FIG. 1 and FIG. 2, the counter substrate 300 includes a convex portion 322 between the seal element 110 and the active area 120 as described later. The surfaces of the array substrate 200 and the counter substrate 300 are covered with alignment films 250 and 350, respectively, for controlling the alignment of the liquid crystal molecules. For use in a transmissive liquid crystal display panel, an optical element 260 is provided outside the array substrate 200, and an optical element 360 is provided outside of the counter substrate 300. That is, the optical elements 260 and 360 are provided on the opposite sides of the liquid crystal layer 400. The optical elements 260 and 360 include polarizers in which a polarization direction thereof is matched to a characteristic of the liquid crystal layer 400.

As shown in FIG. 1, the seal element 110 is arranged between the array substrate 200 and the counter substrate 300 so as to surround the approximate rectangular active area 120. The seal element 110, for example, made of a resin such as a thermosetting resin and an ultraviolet curable resin is applied to a seal portion 115 on one of the substrates that form a liquid crystal display panel, for example, the array substrate 200. Next, another substrate, e.g., the counter substrate 300 is arranged on the array substrate 200 having the seal element 110. Then a pressure is applied to the pair of substrates while the pair of substrates are heated or irradiated with ultraviolet light. According to this process, the seal element 110 is cured and the array substrate 200 and the counter substrate 300 are attached.

Figure 3:
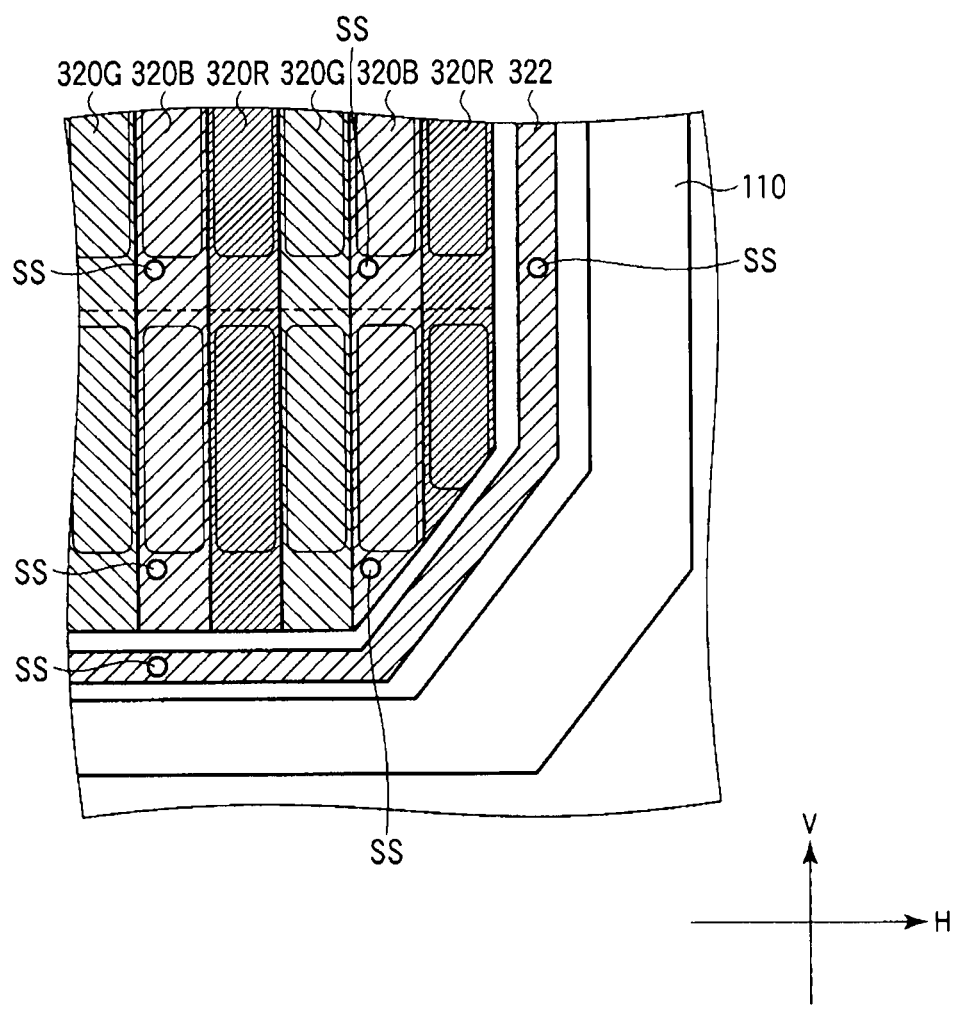
FIG. 3 is a figure showing an example of a structure of a counter substrate in an end of an active area of the liquid crystal display device shown in FIG. 1.

One example of the structure of the counter substrate 300 of the liquid crystal display device according to this embodiment is shown in FIG. 3. The convex portion 322 is arranged between the active area 120 and the seal portion 115 on the counter substrate 300. It is preferable to arrange the convex portion 322 so that the convex portion 322 surrounds the active area 120, and is arranged near the angle portion of the counter substrate 300 at least.

The convex portion 322 is formed with the same material as one of the color filter layers 320 (R, G, B). In addition, it is preferable to form the convex portion 322 with the same material as a layer with the largest film thickness among the color filter layers 320 (R, G, B). Moreover, when the pillar-shaped spacer SS is arranged on the specific colored layer of the color filter layers 320 (R, G, B), it is preferable to form the convex portion 322 with the same material as the colored layer on which the pillar-shaped spacer SS is arranged.

The above structure is originated in that the film thickness of the color filter layer 320 (R, G, B) differs for every color. When arranging the pillar-shaped spacer SS on a specific colored layer, the spacer SS is arranged on a layer with the largest film thickness, and makes the error of the height of the pillar-shaped spacer SS small by designing the height of the pillar-shaped spacer SS low. Thereby, the gap unevenness is reduced. In FIG. 3, since the pillar-shaped spacer SS is arranged on the blue color filter layer 320B, the convex portion 322 is formed with the same material as the blue color filter layer 320B.

Figure 4:
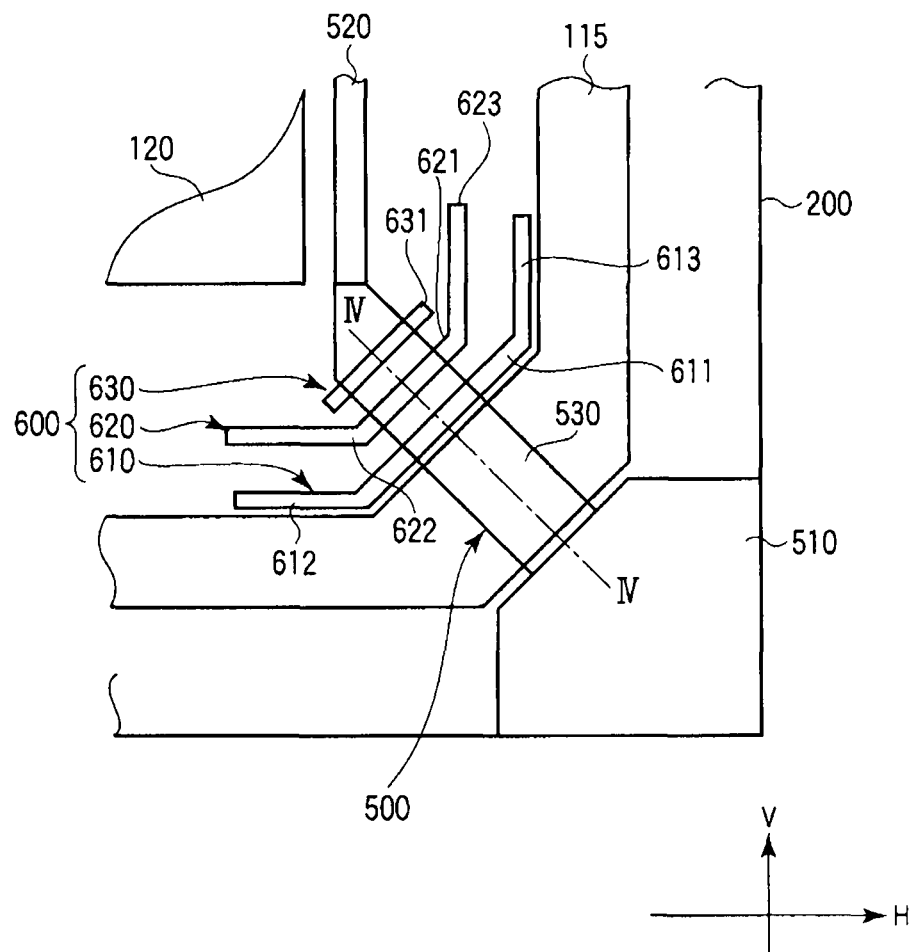
FIG. 4 is a figure showing an example of a structure of an array substrate in an end of an active area of the liquid crystal display device shown in FIG. 1.
Figure 5:
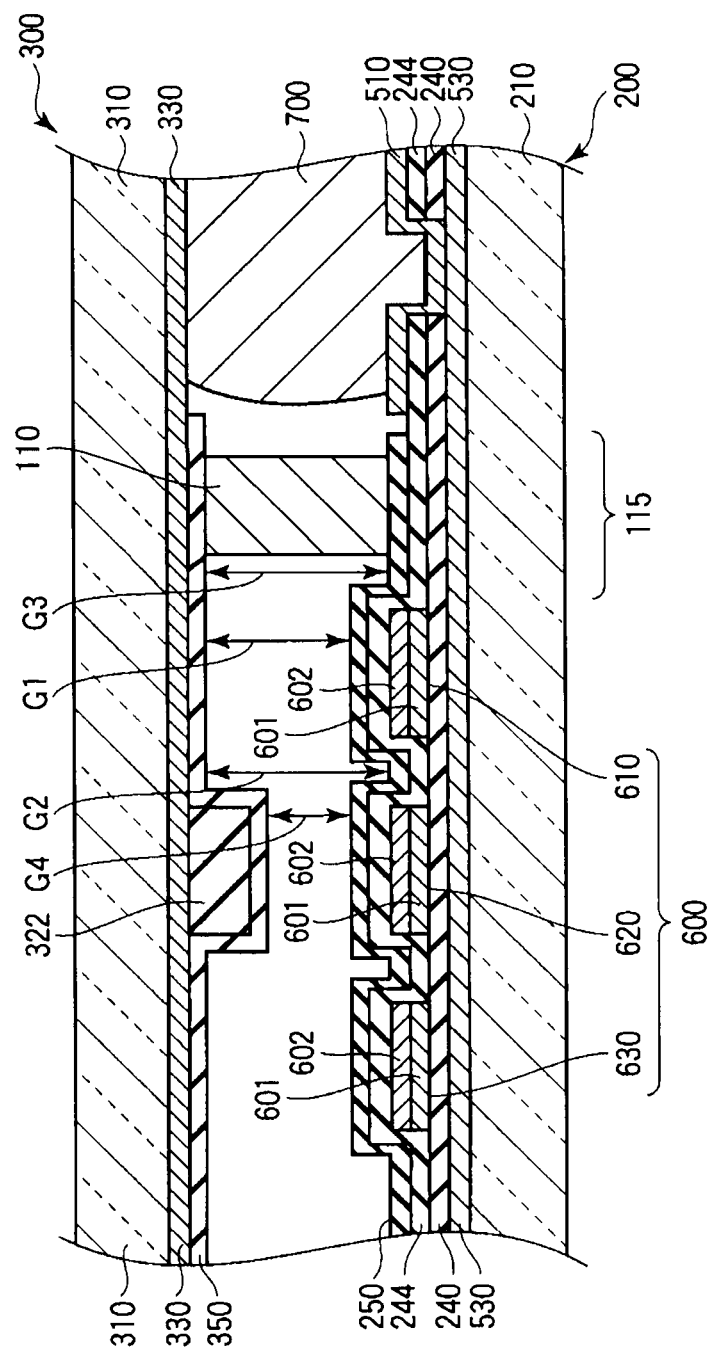
FIG. 5 is a cross-sectional view showing the structure of the liquid crystal display panel and a power supply portion taken along line IV-IV in FIG. 4.

A power supply structure to supply electric power from the array substrate 200 to the counter substrate 330 will be described in detail below. As shown in FIGS. 4 and 5, the array substrate 200 includes a power supply line 500 for supplying a voltage, for example, a common voltage to a common electrode 330 formed on the counter substrate 300. The power supply line 500 includes a power supply pad 510, a common line 520 and a connection line 530.

The power supply pad 510 is formed at the corner portion of the array substrate 200 in which the power supply pad 510 is arranged closer to the edge of the array substrate 200 than the seal portion 115 where the seal element 110 is formed. The power supply pad 510 faces a counter electrode 330 that extends to the edge of the counter substrate 300 beyond the seal portion 115. The power supply pad 510, for example, made of the same material as the pixel electrode 230, is formed on the passivation film 244. The alignment layer 250 is not formed on the power supply pad 510.

The common line 520 is arranged in the space between the seal portion 115 and the active area 120. The common line 520 is set to a voltage, for example, a common voltage by being connected through the connection area 131 or to a signal source directly.

The connection line 530 crosses the seal portion 115 to connect the power supply pad 510 with the common line 520. That is, the connection line 530 is made of the same material as the gate line Y and is formed on an insulating substrate 210. The connection line 530 extends to outside the seal portion 115 (end side of the substrate) and is connected to the power supply pad 510 through a contact hole formed in a double layers of a gate insulating layer 240 and the passivation film 244. The connection line 530 extends to inside of the seal portion 115 (e.g., active area side) and is connected to the common line 520 or integrally formed with the common line 520.

A conductive element 700 is formed on the power supply pad 510 so as to connect the power supply line 500 to the counter electrode 330 of the counter substrate 300. That is, the power supply line 500 is electrically connected to the counter electrode 330 by the conductive element 700 through the power supply pad 510.

In the seal portion 115, the gap between the array substrate 200 and counter substrate 300 in the crossing area where the seal portion 115 crosses with the connection line 530 is smaller than other portions of the seal portion 115, because the thickness of the layer of the connection line 530 decreases the gap between the substrates relative to other portions of the seal portion 115. In the crossing area, the layer of connection line 530, the gate insulating layer 240 and the passivation film 244 are stacked on the insulating substrate 210 while double layers of the gate insulating layer 240 and the passivation film 244 are formed on the insulating substrate 210 in the other portions of the seal portion 115 where the seal portion 115 does not cross with the connection line 530.

The seal element 110 is applied to the seal portion 115 so as to surround the active area 120. In the process for applying the seal element 110, the applying speed is lowered at the corner of the array substrate 200 where the seal element 110 crosses the connection line 530 comparing to other straight-line portions, which results in an accumulation of the seal element 110 at the corner portion of the array substrate 200.

The applied seal element 110 tends to spread by a pressing process where the pair of substrates is attached. In particular, the accumulated seal element 110 tends to flow to the active area 120 from the seal portion along the connection line 530 where the gap between the pair of the substrates is smaller especially.

In this embodiment, the array substrate 200 includes a block member 600 formed of at least two lines with a convex shape for blocking the flow of the accumulated seal element 110, which is provided between the active area 120 and seal portion 115. In the embodiment shown in FIG. 4, the block member 600 includes three block elements of a first block element 610 arranged on the seal portion side, a second block element 620 arranged closer to the active area 120 than the first block element 610 and a third block element 630 arranged closer to the active area 120 than the second block element 620. That is, the first, second and third block elements 610, 620, 630 are arranged along the seal portion 115 in parallel with each other and crossing the connection line 530. The first block element 610 and the third block element 630 are arranged adjacent to the seal portion 115 and the active area 120, respectively. Since the block member 600 is stacked on the connection line 530, the thickness of the array substrate 200 from the insulating substrate 210 is made larger than that in other portions of the connection line 530. The second block element 620 is arranged between the first block element 610 and the third block element 630.

As shown in FIG. 5, in the above embodiment, the convex portion 322 is arranged so that the convex portion 322 of the counter substrate 300 and the second block element 620 of the array substrate 200 face each other. That is, as shown in FIG. 5, the gap G1 between the portion in which the block element 600 faces the counter substrate 300 is smaller than the gap G2 of the portion in which the counter substrate 300 faces the connection line 530 among the block elements (610, 620, 630). Off course, the gap G3 of the portion in which the connection line 530 and the counter substrate 300 face each other is larger than the gap G1 in the seal portion 115, and approximately equal to the gap G2. The gap G4 of the portion in which the second block element 620 and the convex portion 322 face each other is still smaller than the gap G1.

According to the above structure, the seal element 110 applied to the seal portion 115 once spreads toward a portion in which the first block element 610 faces the counter substrate 300 by being accelerated by the small gap (G1) between the first block element 610 and the counter substrate 300. Then, the spread seal element 110 slows down at the slit between the first block element 610 and the second block element 620 with a larger gap (G2). The second block element 620 and the convex portion 322 works as a bank for blocking the flow of the seal element 110. Therefore, the flown seal element 110 almost stops short of the second block element 620 and the convex portion 322.

That is, the seal member 110 flowing along the connection line 530 from the seal portion 115 is spreaded to a lateral direction with reference to the connection line 530 by using the capillary action generated between the first block element 610 and the second block element 620. Accordingly, the spread of the seal element 110 to the active are 120 is prevented beyond the second block element 620 and the convex portion 322.

As described above, the spread to the active area side beyond the second block element 620 is suppressed. Thereby, the block member 600 is formed of at least two block elements between the seal portion 115 and the active area 120, and the convex portion 322 is arranged so as to face the block member 600 arranged on the active area side 120. In case more than two block elements are provided, higher effect is obtained for suppressing the spread of the seal element 110 because the portions that function as the bank increase.

Moreover, when the block member 600 is formed of three or more rows, two or more rows of the convex portions 322 may be arranged so that the convex portions 322 counter the block member 600 on the side of the active area 120 rather than the block member 600 arranged closest to the end side of the substrate. Moreover, although it is preferable to arrange the convex portion 322 so that the convex portion 322 counters the block member 600 on the active area 120 side rather than the outermost block member 600, if the convex portion 322 is arranged on the active area 120 side rather than the outermost block member 600, the convex portion 322 and the block member 600 do not need to counter. At this time, in the direction in which the seal material 110 spreads, the convex portion 322 functions as the bank by forming a portion in which the gap G2 between the array substrate 200 and the counter substrate 300 becomes large. Therefore, the entering of the seal material 110 into the active area 120 can be prevented.

As mentioned above, in the portion in which the electric supply wiring 500 intersects the seal material 110, it becomes possible to control the spread of the seal material 110 to the active area 120. For this reason, it becomes possible to suppress the generation of a poor display due to the seal material 110. Therefore, while becoming possible to obtain good display grace, it becomes possible to control the fall of the manufacturing yield.

Moreover, when the convex portion 322 is formed of two or more colored layers by putting slits into the color filter layer 320 (R, G, B), a portion of the convex portion 322 may become fragments near the angle portion of the active area 120, and may separate from the counter substrate 300, and the yield may get worse. In this embodiment, since the convex portion 322 is formed with the same material as a single colored layer, a portion of the convex portion 322 does not become fragments near the angle portion of the active area 120, and the yield is not worsened. Furthermore, when carrying out patterning of the single colored layer, the convex portion 322 can be formed simultaneously. For this reason, an additional manufacturing process is unnecessary for forming the convex portion 322, and does not cause the increase of a manufacturing cost.

The detailed structure of the above described block member 600 for blocking the flow of the seal element during the manufacturing process will be described below. The block member 600 includes a main body portion with a line shape so as to face the power supply pad 510 interposing the seal portion 115 therebetween. The first block element 610 includes a main body portion 611 that linearly extends in a direction crossing the row direction H and the column direction V at approximately 45°, respectively. Similarly, the second block element 620 and the third block element 630 include main body portions 621 and 631 in parallel with the main body element 611 of the first block element 610.

The main body portions are each arranged so as to orthogonally cross the flowing direction of the seal element 110. According to such construction, the spread of the flowing of the seal element 110 into the active area 120 is effectively prevented.

The first block element 610 arranged at the center and the second element 620 arranged on the seal portion side have an approximate U shape, respectively. The first block element 610 includes a first side portion 612 and a second side portion 613 connected to the main body portion 611 and extending in the row direction H and the column direction V along the seal portion 115, respectively. Similarly, the second block element 620 includes a first side portion 622 and a second side portion 623 arranged in parallel with the first side portion 612 and the second side portion 613 of the first block element 610 and connected to the main body portion 621, respectively. In this embodiment, though the third block element 630 is constructed by only a main body portion 631 with a line shape, it can be formed with the same U-shape as the first and the second block elements 610 and 620 without being limited to the line shape.

In the first and the second block elements 610 and 620, the length of the main body portion 611 (621) may be different from or equal to the side portions 612 and 613 (622, 623). Similarly, the first and second block elements 610 and 620 may be designed so that their shapes are the same in which their length of the main body portions is the same as that of their side portions.

It is preferable to set the length of the side portion 622 (623) of the second block element 620 larger than that of the side portion 612 (613) of the first block element 610 to suppress the spread of the seal element 110 more effectively though a certain effect can be obtained in case that the length of the second side portion 623 of the second block element 620 is smaller than the second side portion 613 of the first block element 610.

According to above arrangement, it is possible to stop the spread of the seal element 110 by not only the main portions but the side portions of the block elements. Therefore, even if excessive seal element 110 is applied to the seal portion at the corner portion of the array substrate 200, the flow of the seal element 110 into the active area 120 around the connection line 530 is prevented.

Each block element is made of the same materials as those used for manufacturing the array substrate 200. That is, the block member 600 includes a first layer 601 made of the same semiconductor material as the semiconductor layer 242 on the gate insulating layer 240 and a second layer 602 made of the same material as the source electrode on the first layer 601. The first layer 601 and the second layer 602 are formed when the switching transistor is made using same manufacturing process, that is, the process for patterning the semiconductor layer and the source electrode of the array substrate 200. Since a further process to form the block member 600 is not required, increase of the manufacturing cost can be avoided.

Further, the block member is manufactured by patterning the semiconductor layer and the source line, and has a stacked configuration. Further, the block member 600 hardly has an undesirable taper shape while the block member 600 manufactured by the patterning of a resin material has a taper shape because each size of the layer is almost the same. Therefore it is possible to form the block member in a small area and suppress the spread of the seal element 110 without sacrificing the narrow frame.

The respective block elements are arranged so as to have a gap between the counter substrate 300 and the array substrate 200. That is, the block member 600 formed on the array substrate 200 is arranged so that the block member 600 does not contact with the counter substrate 300. Similarly, the convex portion 322 does not contact with the counter substrate 300. Therefore, a path between the block member 600 and the counter substrate 300, where the injected liquid crystal material passes, can be obtained, and it becomes possible to suppress the spread of the seal element 110 without blocking the injection of the liquid crystal material.

Moreover, the entering of the seal element 110 into the active area 120 is effectively prevented by arranging the convex portion 322 so as to face the block member 600. This is because the thickness of the array substrate 200 is about 0.5 micrometer even laminating wirings while the gap between the array substrate 200 and the counter substrate 300 is several micrometers. Since the thickness of the color filter layer 320 (R, G, B) is about 1 micrometer, the convex portion 322 functions more effectively as the bank for preventing the entering of the seal material 110.

Furthermore, in the above-mentioned explanation, although the block member 600 formed of two or more rows is arranged in the angle portion of the array substrate 200, the block member 600 may be omitted and the convex portion 322 formed of two or more rows may be formed in the angle portion of the counter substrate 300. Even in such a case, since the thickness of the convex portion 322 becomes larger than the thickness of the block member 600, the convex portion 322 can function as an effective bank and can acquire the same effect as the above-mentioned embodiment. Furthermore, the entering of the seal element 110 into the active area 120 can be prevented more effectively by arranging the block member 600 formed of one or more rows so that the block member 600 may counter the convex portion 322 arranged on the active area side 120 rather than the convex portion 322 arranged in the outermost portion.

Moreover, since the convex portion 322 is arranged so that the convex portion 322 surrounds the active area 120, the convex portion 322 functions as a bank which prevents the seal element 110 from entering into the active area 120 other than the angle portion of the array substrate 200 and the counter substrate 300, and the liquid crystal display device which effectively avoids a poor display, such as a pixel defect, can be offered.

According to this embodiment, a liquid crystal display device can be offered, in which the defect display such as the pixel defect can be avoided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a liquid crystal display panel having an active area for displaying images, the active area having pixels arranged in a matrix shape;
   a first substrate including pixel electrodes of the pixels;
   a second substrate having a plurality of colored layers arranged side by side and a counter electrode arranged on the colored layers facing the respective pixel electrodes;
   a seal element arranged on a seal portion surrounding the active area and attaching the first substrate and the second substrate;
   a liquid crystal layer held between the first substrate and the second substrate; wherein
   the second substrate includes a convex portion arranged between the seal element and the active area, and
   the convex portion is formed of the same material as one of the plurality of colored layers, wherein
   the first substrate further includes a power supply pad arranged at a corner portion of the active area and facing the counter electrode, a common wiring held at common potential and arranged between the active area and the seal portion, a connection wiring connecting the power supply pad and the common wiring crossing the seal portion, and a block element formed of at least two lines crossing the connection wiring,
   the convex portion faces the block element arranged on the active area side rather than the block element arranged closer to an end side of the substrate,
   a gap between the block element and the second substrate is smaller than a gap between the connection wiring located between the lines of the block elements and the second substrate, and
   a gap between the convex portion and the block element is smaller than the gap between the block element and the second substrate.

2. The liquid crystal display device according to claim 1, wherein the convex portion is formed of the same material as one of the plurality of colored layers, the one of the plurality of colored layers having a largest thickness among the colored layers.

3. The liquid crystal display device according to claim 1, further comprising a pillar-shape spacer arranged on one of the plurality of colored layers and held between the first substrate and second substrate, and
   the convex portion is formed of the same material as the colored layer on which the pillar spacer is arranged.

4. The liquid crystal display device according to claim 1, wherein the convex portion is arranged surrounding the active area.

5. A liquid crystal display device comprising:
   a liquid crystal display panel having an active area for displaying images, the active area having pixels arranged in a matrix shape;
   a first substrate including pixel electrodes of the pixels;
   a second substrate having a common electrode facing the pixel electrodes;
   a seal element arranged in a seal portion surrounding the active area so as to attach the first substrate and the second substrate; and
   a liquid crystal layer held between the pair of substrates,
   wherein the first substrate further comprises a power supply pad arranged at a corner portion of the active area facing the common electrode, a common line arranged between the active area and the seal portion for supplying a common voltage, a connection line for connecting the power supply pad to the common line crossing the seal portion, and a block element of a convex shape arranged between the active area and the seal portion crossing the connection line and having first and second block elements forming a slit therebetween, and
   wherein the first block element is arranged on the seal portion side and the second block element is arranged on the active area side, and a convex portion is arranged on the counter substrate facing the second block element.

6. The liquid crystal display device according to claim 5, wherein the convex portion is formed of the same material as one of the plurality of colored layers, the one of the plurality of colored layers having a largest thickness among the colored layers.

7. The liquid crystal display device according to claim 5, further comprising a pillar-shaped spacer arranged on one of the plurality of colored layers and held between the first substrate and second substrate, wherein
   the convex portion is formed of the same material as the colored layer on which the pillar spacer is arranged.

8. The liquid crystal display device according to claim 5, wherein the convex portion is arranged surrounding the active area.

9. The liquid crystal display device according to claim 5, wherein the block element includes a main portion with a line shape which faces the power supply pad, a first side portion extending in a column direction along the seal element and a second side portion extending in a row direction along the seal element, each connected to the main portion.

10. The liquid crystal display device according to claim 9, wherein the length of the main portion of the block member is larger than that of the side portion.

11. The liquid crystal display device according to claim 5, wherein
a gap between the block element and the second substrate is smaller than a gap between the connection wiring located between the lines of the block elements and the second substrate, and
a gap between the convex portion and the block element is smaller than the gap between the block element and the second substrate.

12. The liquid crystal display device according to claim 5, wherein the shape of the first and the second block elements are approximately the same.

13. The liquid crystal display device according to claim 5, wherein the active area further comprises:
a gate line extending in a row direction, a source line extending in a column direction, and a switching transistor having semiconductor material for each pixel;
wherein the first and second block elements include a first layer made of the same material as the semiconductor material and a second layer made of the same material as the source line, each being stacked on the first layer.

14. The liquid crystal display device according to claim 5, wherein the power supply pad is connected with the counter electrode by a conductive element arranged between the array substrate and the counter electrode.

15. The liquid crystal display device according to claim 5, further comprising a third block element arranged between the second block element and the active area on the array substrate.

* * * * *